United States Patent
Wu et al.

(10) Patent No.: US 12,179,627 B2
(45) Date of Patent: *Dec. 31, 2024

(54) APPARATUS AND METHOD FOR ELECTRIC VEHICLE BATTERY RESOURCE SHARING

(71) Applicants: Lixiong Wu, Lake Oswego, OR (US); Elric Wu, Lake Oswego, OR (US)

(72) Inventors: Lixiong Wu, Lake Oswego, OR (US); Elric Wu, Lake Oswego, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 18/126,254

(22) Filed: Mar. 24, 2023

(65) Prior Publication Data

US 2023/0226945 A1    Jul. 20, 2023

Related U.S. Application Data

(63) Continuation of application No. 17/714,372, filed on Apr. 6, 2022, now Pat. No. 11,642,978.

(Continued)

(51) Int. Cl.
| | |
|---|---|
| *H02J 7/00* | (2006.01) |
| *B60L 53/50* | (2019.01) |
| *B60L 53/60* | (2019.01) |
| *B60L 53/65* | (2019.01) |
| *B60L 53/66* | (2019.01) |

(Continued)

(52) U.S. Cl.
CPC ............ *B60L 53/80* (2019.02); *B60L 53/50* (2019.02); *B60L 53/60* (2019.02); *B60L 53/65* (2019.02); *B60L 53/665* (2019.02); *B60S 5/06* (2013.01); *H01M 50/20* (2021.01); *H01M 2220/20* (2013.01)

(58) Field of Classification Search
CPC .......... B60L 53/80; B60L 53/60; B60L 53/50; B60L 53/665; B60L 53/65; H01M 50/20
USPC ........................................................ 320/109
See application file for complete search history.

(56) References Cited

U.S. PATENT DOCUMENTS

| | | |
|---|---|---|
| 5,711,648 A | 1/1998 | Hammerslag |
| 6,094,028 A | 7/2000 | Gu |

(Continued)

OTHER PUBLICATIONS chrome-extension;//efaidnbmnnnibpcajpcgiclefindmkaj/https://www.sb-mc.net/uploads/1/2/1/4/121453783/sbmc_position_paper_01.pdf, Swappable Batteries Motorcycke Consortium (Year: 2021).

(Continued)

*Primary Examiner* — Alexis B Pacheco
(74) *Attorney, Agent, or Firm* — Mohr Intellectual Property Law Solutions, PC (57) ABSTRACT

A system and method for an electric vehicle (EV) battery resource sharing system is provided. One embodiment has a plurality of battery modules and a plurality of battery exchange facilities. Each different EV contains a battery swap cabinet that is configured to releasably secure at least one of the plurality of battery modules within the EV. A user of an EV, while at the battery exchange facility, exchanges a discharged first battery module for a second battery module that has been recharged. The battery exchange facility releases the recharged second battery module to the user after a payment has been made by the user. The battery exchange facility subsequently recharges the discharged first battery module after the user has placed the discharged first battery module into the battery exchange facility.

19 Claims, 3 Drawing Sheets

Related U.S. Application Data (60) Provisional application No. 63/175,797, filed on Apr. 16, 2021.

(51) Int. Cl.
  *B60L 53/80* (2019.01)
  *B60S 5/06* (2019.01)
  *H01M 50/20* (2021.01)
  *H02J 7/14* (2006.01)

(56) References Cited

U.S. PATENT DOCUMENTS

| | | | |
|---|---|---|---|
| 9,187,004 B1 | 11/2015 | Davis | |
| 2009/0198372 A1* | 8/2009 | Hammerslag | G07F 15/005 700/226 |
| 2010/0071979 A1* | 3/2010 | Heichal | B60L 50/51 180/68.5 |
| 2010/0145717 A1* | 6/2010 | Hoeltzel | B60K 1/04 320/109 |
| 2010/0181129 A1* | 7/2010 | Hamidi | B60L 53/80 180/68.5 |
| 2014/0002019 A1* | 1/2014 | Park | B60L 50/66 320/109 |
| 2015/0367743 A1 | 12/2015 | Lin et al. | |
| 2016/0368464 A1* | 12/2016 | Hassounah | B60L 53/80 |
| 2017/0327091 A1* | 11/2017 | Capizzo | B64U 80/86 |
| 2018/0154789 A1 | 6/2018 | Janku | |
| 2019/0070967 A1* | 3/2019 | Ishigaki | B60L 58/12 |
| 2019/0118782 A1 | 4/2019 | O'Hora | |
| 2019/0207267 A1 | 7/2019 | Vickery | |
| 2019/0207398 A1 | 7/2019 | Shih | |
| 2019/0275909 A1 | 9/2019 | Lin et al. | |
| 2019/0359198 A1 | 11/2019 | Velderman | |
| 2019/0369641 A1 | 12/2019 | Gillett | |
| 2020/0164760 A1 | 5/2020 | Sohmshetty | |
| 2020/0175551 A1 | 6/2020 | Penilla | |
| 2020/0206962 A1 | 7/2020 | Sohmshetty | |
| 2020/0262305 A1 | 8/2020 | Chakraborty | |
| 2020/0406780 A1 | 12/2020 | Hassounah | |
| 2021/0347275 A1 | 11/2021 | Chakraborty | |

OTHER PUBLICATIONS https://chargedevs.com/newswire/japanese-consortium-agrees-on-standardized-swappable-batteries-for-e-motorcycles/ (Year: 2021).
https://www.gogoro.com/news/the-gogoro-network-smart-battery-all-brain-all-brawn/?utm.
International Search Report and Written Opinion, PCT/US22/23612, Jul. 19, 2022.

* cited by examiner

APPARATUS AND METHOD FOR ELECTRIC VEHICLE BATTERY RESOURCE SHARING

PRIORITY CLAIM

This application is a continuation of, and claims priority to, copending U.S. application Ser. No. 17/714,372, filed on Apr. 6, 2022, entitled APPARATUS AND METHOD FOR ELECTRIC VEHICLE BATTERY RESOURCE SHARING, which claims priority to U.S. Provisional Application, Ser. No. 63/175,797, filed on Apr. 16, 2021, entitled APPARATUS AND METHOD FOR ELECTRIC VEHICLE BATTERY RESOURCE SHARING, which are hereby incorporated by reference in their entirety for all purposes.

BACKGROUND OF THE INVENTION

Electric vehicles (EVs) are becoming available to consumers as the various issues pertaining to power, speed, range and safety have been overcome. Consumers now have more choices in available EVs as more manufacturers begin to produce EVs in increasingly different styles.

However, all EVs inherently have the drawback of having a limited power supply. Namely, the EV power supply consists of a bank of rechargeable batteries. At some point, the EV battery power supply runs out and must be recharged. Consequently, the owner of the EV 102 is not able to use their EV during the battery recharging period.

Figure 1:
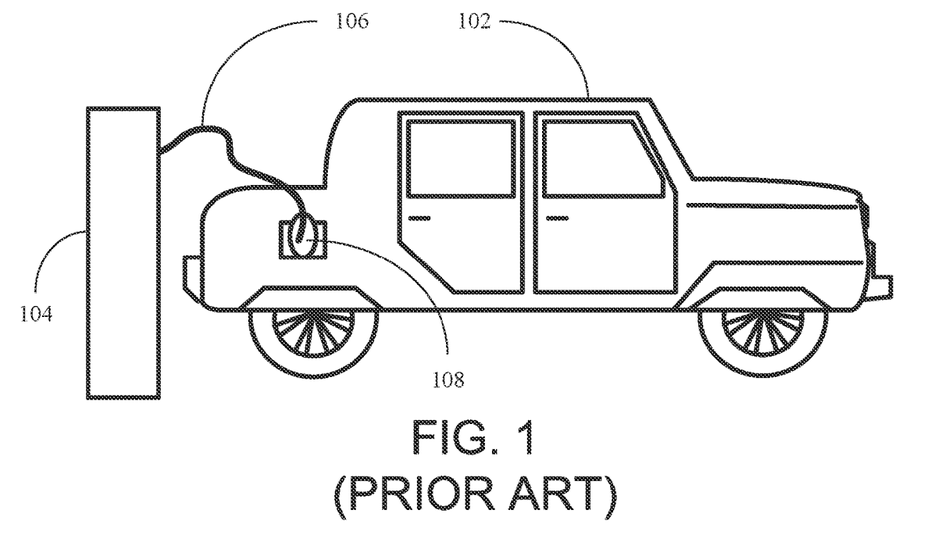
FIG. 1 is a diagram of a conventional EV.

FIG. 1 is a diagram of a conventional EV 102. To recharge the EV battery power supply, the EV owner simply connects their EV 102 to a suitable recharging station 104 using an electrical cable 106 and plug 108. The EV 102 must remain stationary during the battery recharging process. Typically, the recharging may take some discernable amount of time for the recharging to complete. Or, at least some amount of time is required for partial recharging so that the EV 102 can be used for travel over a limited range.

Such recharging stations 104 are limited in number. Further, a recharging station 104 may not be available when and/or where the EV owner needs to perform a battery recharging operation.

This limitation may be extremely inconvenient for the EV owner, especially during a long distance trip that exceeds the battery's power supply range. Here, the EV owner would be required to stop for battery recharging at some point during their trip.

Accordingly, in the arts of electric vehicles, there is a need for improved methods, apparatus, and systems for providing electric power to an EV 102.

SUMMARY OF THE INVENTION

Embodiments of the EV battery resource sharing system provide a system and method for an electric vehicle (EV) battery resource sharing system. One embodiment has a plurality of battery modules and a plurality of battery exchange facilities. Each different EV contains a battery swap cabinet that is configured to releasably secure at least one of the plurality of battery modules within the EV. A user of an EV, while at the battery exchange facility, exchanges a discharged first battery module for a second battery module that is recharged. The battery exchange facility releases the recharged second battery module to the user after payment has been made by the user. The battery exchange facility recharges the discharged first battery module after the user has placed the discharged first battery module into the battery exchange facility.

An objective of the EV battery resource sharing system is to provide battery standardization across the EV industry. The standardization includes standardization of the shape, size, terminal voltage, terminal connectors, and communication protocols for EV battery modules. Accordingly, the EV battery is no longer bound to a particular vehicle. Another objective is to provide a robust and reliable tracking system and protocol for standardized EV battery modules.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 2:
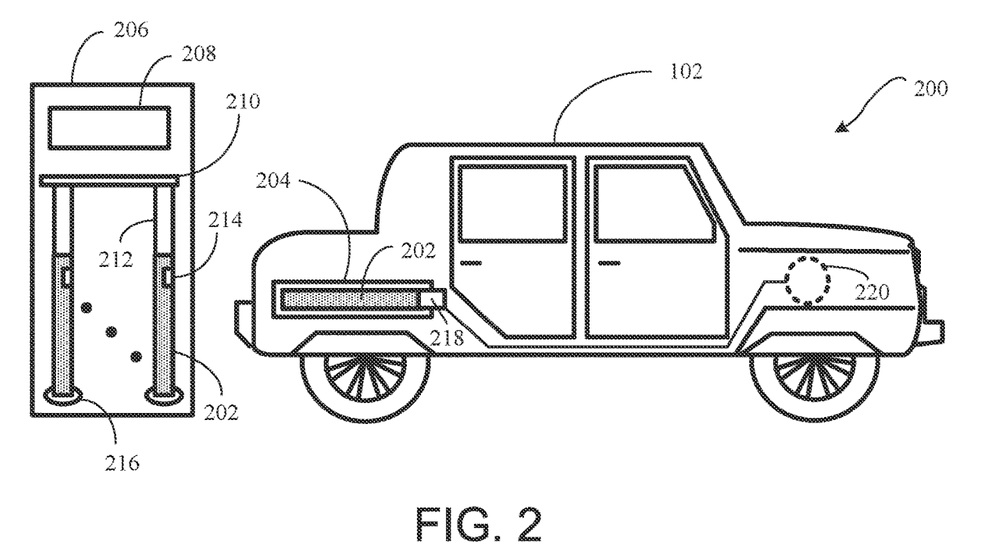
FIG. 2 is a block diagram of an EV provisioned with an EV battery resource sharing system.

FIG. 2 is a block diagram of an Electric Vehicle (EV) 102 provisioned with an EV battery resource sharing system 200. Embodiments of the EV battery resource sharing system 200 comprise a battery module 202 that provides power (electrical energy) to operate the EV 102, a battery swap cabinet 204 disposed within the EV 102 which secures the battery module 202 and couples the battery module 202 to the power system of the EV 102, and a battery exchange facility 206. A plurality of battery exchange facilities 206 are conveniently dispersed over a geographic service area. Each battery exchange facility 206 is configured to secure a plurality of battery modules 202. A battery resource manager 208 resides in the battery exchange facility 206 and manages the battery module swap out process (exchange process), wherein a discharged battery module 202 is removed from the EV 102 and is replaced with a recharged battery module 202 from the battery exchange facility 206.

The disclosed systems and methods for EV battery resource sharing system 200 will become better understood through review of the following detailed description in conjunction with the figures. The detailed description and figures provide examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, various examples for systems and methods for EV battery resource sharing system 200 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in a previously explained example. Features specific to a given example will be described in that particular example. The reader should understand that a given feature need not be the same or similar to the specific portrayal of a related feature in any given figure or example. For example, the EV battery resource sharing system 200 may be provisioned in other types of vehicles, such as vessels, aircraft, hybrid gas/electric vehicles, or the like.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly cited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components. "Secured to" means directly connected without intervening components.

Figure 3:
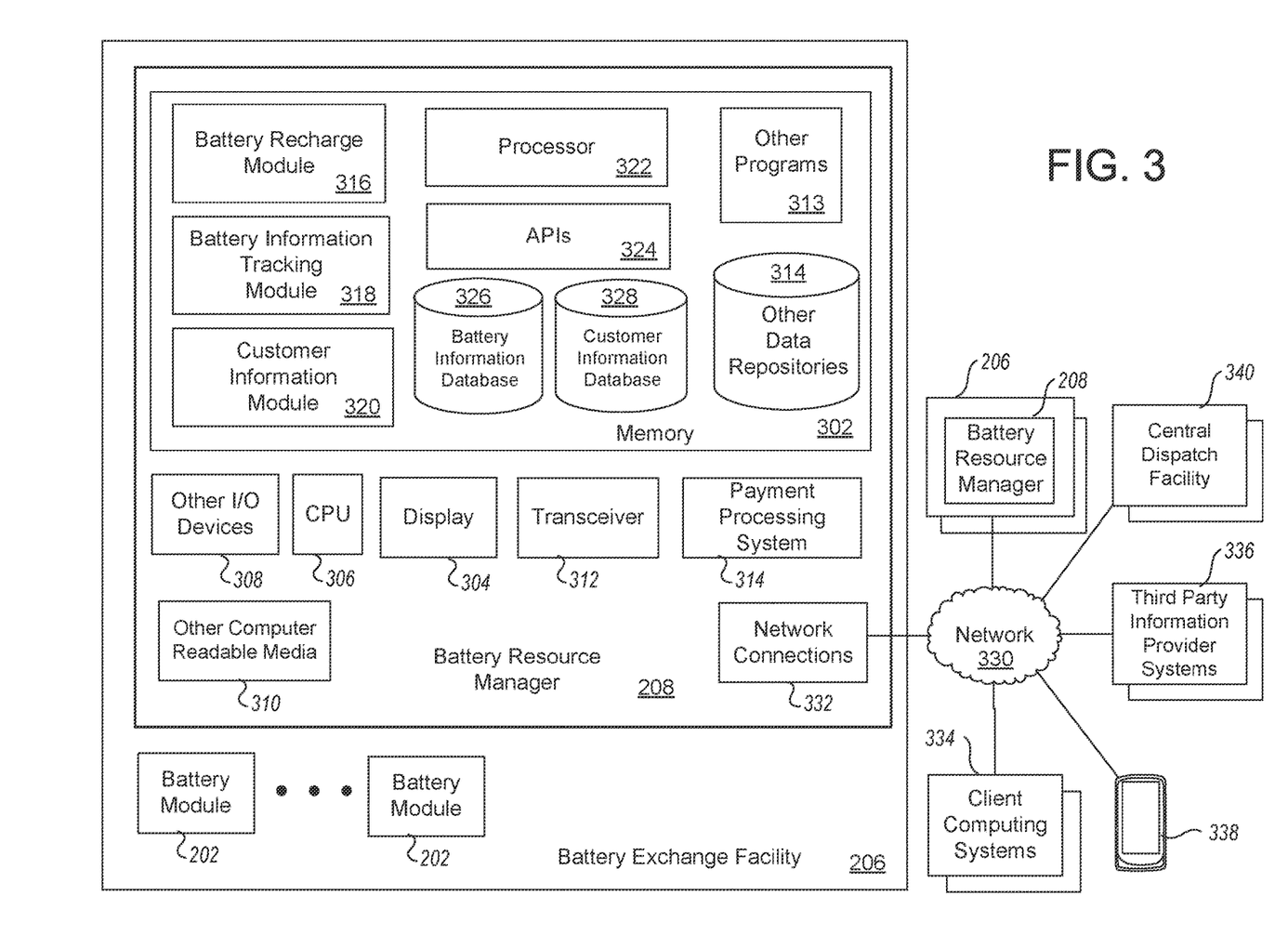
FIG. 3 is an example block diagram of an example computing system that may be used to practice embodiments of an EV battery resource sharing system.

"Communicatively coupled" means that an electronic device exchanges information with another electronic device, either wirelessly or with a wire based connector, whether directly or indirectly through a communication network 330 (FIG. 3). "Controllably coupled" means that an electronic device controls operation of another electronic device.

Returning to FIG. 2, the battery module 202 in the EV 102 is safely secured within the battery swap cabinet 204. Each battery module 202 has a standardized set of terminals that mate with and connect to corresponding terminals in the battery swap cabinet 204. Here, each of the different models of EVs 102 manufactured by a plurality of different vehicle manufacturing companies have standardized battery swap cabinets 204 with terminals configured to receive power from a standardized battery module 202.

The battery swap cabinets 204 preferably have cabinet doors that are easily and conveniently accessed by the user during a battery module 202 swap out. The battery swap cabinet 204 may be configured to enable access to the secured battery module 202 from the back, the front, the bottom, and/or the side of the EV 102. Since powering the EV 102 may require a relatively large amount of power capacity, and because an individual battery module 202 must be easily handled by a person, any particular EV 102 may be configured to hold and secure a plurality of battery modules 202 in one or more battery swap cabinets 204. That is, the standardized battery module 202 would have a size and/or weight that permits a typical user to manipulate the battery module 202 easily and conveniently, with or without assistance of a fixture, with or without handles or other grasping devices attached to the battery.

The terminals 218 of the battery swap cabinet 204 are coupled to the power system and the electronic control system of the EV 102. Depending upon the power requirement characteristics of the motor 220 of the EV 102, the battery swap cabinet 204 may be configured to releasably secure multiple battery modules 202. The battery swap cabinet 204 provides protection to the EV 102 and the battery module 202, and serves as an anti-theft deterrent.

Preferably, each battery module 202 may be handled by the operator of the EV 102 or another individual to facilitate the battery module swap out process. With some EV's 102, a plurality of battery modules 202 may be used to provide power. In practice, the operator or other individual may choose to replace only those discharged battery modules 202 with replacement recharged battery modules 202. Fully charged or partially charged battery modules 202 would not necessarily have to be replaced.

Similar to filling a legacy vehicle with gasoline, the EV operator drives their EV 102 to the battery exchange facility 206. The EV operator or another individual then removes the discharged or partially discharged battery module(s) 202 from the battery swap cabinet 204. In some embodiments, a robotic machine may remove and replace the battery module 202. The EV operator or other individual then retrieves the recharged battery module(s) 202 from the battery exchange facility 206 and then installs the battery module(s) 202 into the battery swap cabinet 204 of their EV 102.

When the recharged battery module is received by the user, the battery resource manager 208 reports the information to the central dispatch facility 340 (FIG. 3). The information includes at least the identifier of the recharged battery module that is received by the user, information that identifies the user (identity information), and a time (date and optionally hour of day) that the recharged battery module was received by the user. Any other information of interest may be included in the communicated information. For example, operational status information describing the operational condition of the battery module 202 may be sent to the central dispatch facility 340. Sales price paid by the user, cost information pertaining to the cost of recharging the battery module 202, information identifying the owner of the battery module 202, and the type and/or model of the EV 102 are other non-limiting examples of information that can be communicated to the central dispatch facility 340. With this information, the central dispatch facility 340 can track the movement, a usage or use history of, and/or cost data for a particular battery module 202.

Battery modules 202 may be standardized to provide power to a plurality of different models of EVs 102 manufactured by a plurality of different vehicle companies. The battery modules 202 enable the EV battery resource sharing system 202 to provide battery standardization across the EV industry. The standardization includes standardization of the shape, size, terminal voltage, and communication protocols for EV battery modules. Accordingly, the EV battery is no longer bound to a particular vehicle. For example, a sedan, a sports car, a truck, a van, a bus, and a recreational vehicle (RV) are a non-limiting example list of vehicle models. Further, there may be a variety of different sized and/or configured battery modules 202 that have been standardized across the industry to accommodate different models of an EV 102. Accordingly, a standardized battery module 202 is defined as a battery module 202 that is configured to be secured in a battery swap cabinet 204 of different models of vehicles that are made by different vehicle manufacturing companies.

An unexpected benefit of standardizing battery modules 202 is that the initial purchase cost of an EV 102 may be reduced since the purchaser does not have to pay for the power supply and/or since the manufacturer may not have to equip the EV 102 with the battery modules 202. The purchaser can pay for the service (use) of their battery modules 202, such as under a leasing or rental program managed by a third party vendor, thus avoiding the initial purchase price of the EV's power supply. (One skilled in the art appreciates that a battery exchange facility 206 may be located at the vehicle point of purchase so that dealership can provide the one or more recharged battery modules 202 to the purchaser.)

The EV operator or other individual also places the discharged battery module(s) 202 in the battery exchange facility 206. The discharged battery module(s) 202 are then releasably secured by the battery exchange facility 206.

Each battery exchange facility 206 has a power supply bus 210 that is coupled to one or more of the local area electric power grid, a solar panel, a wind generator, or another power source (not shown). The discharged battery module(s) 202 are then recharged with electrical power received from the electric power grid via the power supply bus 210 within the battery exchange facility 206.

In practice, each recharged battery module 202 has at least a predefined amount of electrical power that is stored in the battery module 202. Accordingly, the EV operator knows how much electrical power that they are purchasing when they receive a recharged battery module 202. For example, the predefined electrical power of a recharged battery module 202 may be, for example, but not limited to, fifty kilowatt-hours (50 kWh). Any suitable predefined amount of electric al power may be used in the various embodiments.

One skilled in the art appreciates that capacity of any particular battery module 202 may vary based on the age of the battery module 202, the number of recharging cycles the battery module 202 has gone through, the type of battery cell material, or the like. Such characteristics of the battery module 202 may be used to assess the state of the battery module 202. So long as the capacity of the battery module 202 is greater than the predefined amount of electrical power, the battery module 202 may be recharged up to the predefined amount of electrical power. One skilled in the art understands that battery capacity degrades over the useful lifetime of the battery module 202. When the capacity of the battery module 202 falls below a predefined or a predetermined amount of electrical power, that battery module 202 may be identified for removal or retirement.

Individual battery modules 202 are coupled to the power supply bus 210 via an intervening disconnect device 212. Each disconnect device 212 is controllably coupled to the battery resource manager 208. The recharging process is controlled by the battery resource manager 208. The battery resource manager 208 monitors the amount of electrical power provided to the discharged battery module 202 during a recharging process. Other characteristics of the recharging may be monitored, such as time of recharge, rate of recharge, or the like. Such information may be used to evaluate the condition of the recharging battery module 202. The battery resource manager 202 actuates the disconnect device 212 to decouple (disconnect) the discharged battery module 202 after the discharged battery module 202 has been recharged with a predefined amount of electrical power.

In the various embodiments, the operators of the battery exchange facility 206 may determine the amount of electrical power that is required for recharging a returned discharged or partially discharged battery module 202. For example, but not limited to, the actual charge level may be monitored while the amount of recharging electrical power is metered. The recharging process may end when the actual charge reaches the predefined amount of electrical power. Alternatively, the amount of residual electrical power may be determined, and then the difference between the predefined amount of electrical power and the amount of residual electrical power can be provided to the recharging battery module 202. Any suitable process of managing the amount of electrical power that is provided during the recharging process may be used in the various embodiments of the EV battery resource sharing system 200.

As noted above, a returned discharged battery module 202 will likely have some amount of remaining or residual stored electrical power. Accordingly, the operator of the battery exchange facility 206 will only need to provide an amount of electrical power required to recharge the battery module 202 to the predefined amount of electrical power. Returning to the hypothetical example of the 50 kWh predefined amount of electrical power, if the residual charge on the returned battery module 202 is 5 kWh, then the recharging requires only 45 kWh. If another returned battery module 202 has 10 kWh of remaining charge, then the operator of the battery exchange facility 206 needs only to provide 40 kWh to recharge that battery module 202. An unexpected benefit to the operator of the battery exchange facility 206 is that the recharging cost can be accurately managed. That is, the operator of the battery exchange facility 206 does not have to pay for the cost of power if the recharging process stops when the charge level of the battery module 202 reaches the predefined amount of electrical power.

Embodiments of the EV battery resource sharing system 200 may be configured to recharge a battery module 202 using the most cost efficient available power source. Accordingly, some embodiments may include a plurality of power supply busses 210, and may be coupled to different sources of power, such as the electric power grid, a solar panel, and/or a wind turbine. A disconnect device, switch or the like may be used to selectively couple the battery exchange facility 206 to a selected power source that provides the lowest cost energy for recharging the battery module 202.

Alternatively, or additionally, embodiments of the EV battery resource sharing system 200 may be configured to recharge a battery module 202 during off peak power times when the cost of power may be less than at other times of the day. Off peak times are known to be periods of time when usage of power by all customers on the power grid is below some threshold level. The power suppliers typically sell power at reduced rates during off peak times. During other times of the day, such as during the peak demand time of the day where power consumption is typically at a maximum rate by all customers connected to the power grid, the rate charged for purchasing power may be greater.

For example, the battery exchange facility 206 may delay recharging of returned battery modules 202 so long as there is a sufficient number of recharged battery modules 202 available for customers. Here, if the number of recharged battery modules 202 drops below a predefined threshold number, then the battery exchange facility 206 may immediately recharge one or more of the secured discharged battery modules 202 so that sufficient quantaties of recharged battery modules 202 are available for customers. Otherwise, the battery exchange facility 206 may delay recharging until off peak times of the day.

Some embodiments of the battery exchange facility 206 may be configured to purchase power from different power providers if permitted by the regional regulating authority. Here, power may be purchased from a particular power supplier having a favorable cost, and then transmitted to the battery exchange facility 206 via the electric grid.

After the battery module 202 has been recharged, the battery resource manager 208 saves information indicating that that particular battery module 202 is now recharged and is available for another customer. Accordingly, the battery resource manager 208 is able to access information stored in the battery information database 326 (FIG. 3) to ascertain the charging state of each of the battery modules 202.

Further, when another customer comes to the battery exchange facility 206 to exchange a discharged battery module 202 for a recharged battery module 202, the battery resource manager 208 can identify a particular recharged battery module 202 based on the stored information, and then release that identified recharged battery module 202 to the customer after payment.

Alternatively, or additionally, the identified recharged battery module 202 may be released to the customer after the discharged battery module 202 has been returned to the battery exchange facility 206 by the customer. In some embodiments, the customer may receive a credit for the return of the discharged battery module 202 to the battery exchange facility 206. Alternatively. or additionally, the battery resource manager 208 may automatically charge the customer through a third party billing system 336 (FIG. 3), and then release the recharged battery module 202 to the customer after confirmation of payment from the third party billing system 336. These above-described activities may be performed by the battery resource manager 208 located at the battery exchange facility 206 and/or at the central dispatch facility 340 (FIG. 3).

Each battery module 202 has a unique identifier (ID). Preferably, the ID of the battery module 202 is readable by the battery resource manager 208. For example, the battery module 202 may have a bar code or the like that is scanned by the battery resource manager 208. Alternatively, or additionally, the battery module 202 may have a module information device 214, such as a radio frequency identification (RFID) tag or other electronic scannable identifying device that is readable by the battery resource manager 208. Alternatively, or additionally, each battery module 202 may be provisioned with a mobile information device 214 that contains the ID information, and optionally other supplemental information in a memory, for that particular battery module 202. Information in the memory may be accessed using a hard wired or wireless communication format.

Supplemental information, such as, but not limited to, dimensions of the battery module 202, manufacturer of the battery module 202, owner of the battery module 202, owner contact information, or the like may be included with the ID information. The supplemental information may be used for revenue sharing purposes such that the owner of the battery exchange facility 206 is compensated for recharging an exchanged discharged battery module 202, and the owner of the battery module 202 is compensated for their investment in a battery module 202. For example, the battery resource manager 208 may determine the cost of recharging an exchanged battery module 202. After the recharging cost is deducted from the fee paid by the customer (interchangeably referred to herein as the user) to acquire the recharged battery module 202, the remaining amount of money may be shared among the owner of the battery module 202, the owner of the battery exchange facility, and other interested parties. That is, the fee includes three components: a component for the energy cost (paid to the power provider), a fee for usage of the battery module 202 (paid to the owner of the battery module 202), and a service fee (paid to the owner of the battery exchange facility 206).

In some embodiments, in a returned, partially discharged battery module 202 may be determined. A credit for the amount of remaining power (energy) may then be computed and applied to the customer who is returning the battery module 202. For example, the customer may be travelling to a location where the partially discharged battery module 202 does not have sufficient power to complete the trip. Accordingly, the customer may return a partially discharged battery module 202 that has some remaining amount of power. To illustrate, the partially discharged battery module 202 may have a remaining amount of power equal to twenty five percent (25%) of the capacity of the battery module 202. Here, a computed value of the remaining power may be applied as a credit to the cost that the customer pays to obtain a recharged battery module 202 from the battery exchange facility 206.

In some embodiments, the RFID tag 214 may also be used for device tracking by a remote party and/or by the battery resource manager 208. Here, the current location of a specific battery module 202 can be determined.

In some embodiments, a securing device 216 releasably secures each of the individual battery modules 202 within the battery exchange facility 206. Preferably, each securing device 216 is controllably coupled to the battery resource manager 208. For example, when a user has paid for a recharged battery module 202, the battery resource manager 208 may actuate the securing device 216 to release a selected battery swap cabinet 204. When a user returns a discharged battery module 202 to the battery exchange facility 206, the battery resource manager 208 may actuate a selected securing device 216 to releasably secure the returned battery module 202.

FIG. 3 is an example block diagram of an example computing system that may be used to practice embodiments of an EV battery resource sharing system 200 described herein. Note that one or more general purpose virtual or physical computing systems suitably instructed or a special purpose computing system may be used to implement the EV battery resource sharing system 200. Further, the EV battery resource sharing system 200 may be implemented in software, hardware, firmware, or in some combination to achieve the capabilities described herein.

Note that one or more general purpose or special purpose computing systems/devices may be used to implement the described techniques. However, just because it is possible to implement the EV battery resource sharing system 200 on a general purpose computing system does not mean that the techniques themselves or the operations required to implement the techniques are conventional or well known.

The battery resource manager 208 may comprise one or more server and/or client computing systems and may span distributed locations. In addition, each block shown may represent one or more such blocks as appropriate to a specific embodiment or may be combined with other blocks. Moreover, the various blocks of the battery resource manager 208 may physically reside on one or more machines, which use standard (e.g., TCP/IP) or proprietary interprocess communication mechanisms to communicate with each other.

In the embodiment shown, the battery resource manager 208 comprises a computer memory ("memory") 302, a display 304, one or more Central Processing Units ("CPU") 306. Input/Output devices 308 (e.g., keyboard, mouse, CRT or LCD display, etc.), other computer-readable media 310, an optional wireless transceiver 312, an optional payment processing system 314, and one or more network connections 332. A portion of the battery exchange facility 206 is shown residing in memory 302. In other embodiments, some portion of the contents, and some or all of the components of the battery resource manager 208 may be stored on and/or transmitted over the other computer-readable media 310. The components of the battery resource manager 208 preferably execute on one or more CPUs 306 and manage the recharging and information tracking of the battery module 202, as described herein. Other code or programs 313 and potentially other data repositories, such as data repository 314, also reside in the memory 302, and preferably execute on one or more CPUs 306. Of note, one or more of the components in FIG. 3 may not necessarily be present in any specific implementation. For example, some embodiments embedded in other software may not provide means for user input or display.

In a typical embodiment, the battery resource manager 208 includes a battery recharge module 316, a battery information tracking module 318, a customer information module 320, a processor 322, APIs 324, a battery information database 326 and a customer information database 328. In at least some embodiments, the battery information database 326 and/or the customer information database 328 may be provided external to the battery exchange facility 206 and be available, potentially, over one or more networks 330 via network connections 332. Other and/or different modules may be implemented. In addition, the battery resource manager 208 may interact via a network 330 with one or more client computing systems 334, one or more third-party information provider systems 336, and one or more mobile electronic devices 338, such as, but not limited to, smart phones. Also, of note, the battery information database 326 and a customer information database 328 may be external to the battery resource manager 208 as well, for example in a Web-based knowledge base accessible over one or more networks 330.

In an example embodiment, components/modules of the battery resource manager 208 are implemented using standard programming techniques. For example, the battery resource manager 208 may be implemented as a "native" executable running on the CPU 306, along with one or more static or dynamic libraries. In other embodiments, the battery resource manager 208 may be implemented as instructions processed by a virtual machine. In general, a range of programming languages known in the art may be employed for implementing such example embodiments, including representative implementations of various programming language paradigms, including, but not limited to, object-oriented (e.g., Java. C++, C #, Visual Basic. NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use well-known or proprietary, synchronous or asynchronous, client-server computing techniques. Also, the various components may be implemented using more monolithic programming techniques, for example, as an executable running on a single CPU computer system, or alternatively decomposed using a variety of structuring techniques known in the art, including, but not limited to, multiprogramming, multi-threading, client-server, or peer-to-peer, running on one or more computer systems each having one or more CPUs. Some embodiments may execute concurrently and asynchronously and communicate using message passing techniques. Equivalent synchronous embodiments are also supported. Also, other functions could be implemented and/or performed by each component/module, and in different orders, and/or in different components/modules, yet still achieve the described functions.

In addition, programming interfaces for data stored as part of the battery resource manager 208 (e.g., in the battery information database 326 and the customer information database 328) can be available by standard mechanisms such as through C, C++, C #, and Java APIs; libraries for accessing files, databases, or other data repositories; through scripting languages such as XML; or through Web servers, FTP servers, or other types of servers providing access to stored data. The battery information database 326 and a customer information database 328 may be implemented as one or more database systems, file systems, or any other technique for storing such information, or any combination of the above, including implementations using distributed computing techniques.

Also, the example battery resource manager 208 may be implemented in a distributed environment comprising multiple, even heterogeneous, computer systems and networks. Different configurations and locations of programs and data are contemplated for use with techniques of described herein. Also, one or more of the modules 316, 318, 320 may themselves be distributed, pooled or otherwise grouped, such as for load balancing, reliability or security reasons. A variety of distributed computing techniques are appropriate for implementing the components of the illustrated embodiments in a distributed manner, including, but not limited to, TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed among the components/modules in different ways, yet still achieve the functions of the battery resource manager 208.

Furthermore, in some embodiments, some or all of the components of the battery resource manager 208 may be implemented or provided in other manners, such as at least partially in firmware and/or hardware, including, but not limited to, one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

In practice, when the operator of the EV 102 arrives at the battery exchange facility 206, the operator/customer provides various input, via the I/O devices 308, to identify themselves to the battery resource manager 208. In response to receiving the identifying information of the operator/customer, the customer information module 320 may access the customer information database 328 to determine if the identified operator/customer is authorized to return a discharged battery module 202, receive a recharged battery module 202, and/or exchange the discharged battery module 202 for a recharged battery module 202.

If payment at the time of return, receipt, and/or exchange for one or more battery modules 202 is required, payment may be made via the payment processing system 314 (such as a credit card machine, cash machine, or the like). Interactive feedback may be presented to the operator by presenting text and/or image information on the display 304. Alternatively, or additionally, the operator may use a personal mobile electronic device 338, such as a smart phone or a cellphone, to communicate with the battery resource manager 208 that receives wireless data via the transceiver 312 or one of the network connections 332. Another transceiver 312 may be configured to receive information from the RFID tag 214 of a battery module 202. Alternatively, or additionally, the customer information module 320 may send an invoice and/or receipt to a client computing system 334 (and/or a personal mobile electronic device 338) of the operator/customer (interchangeably referred to herein as a user), and/or to a third party information provider system 336. For example, the third party, such as a credit card company, a bank or the like, may remotely handle invoicing and payment processing.

As the discharged battery module 202 is exchanged for a recharged battery module 202, the battery information tracking module 318 associates the identity of the exchanged battery modules 202 with the operator/customer. This information, along with other supplemental information, is saved into the battery information database 326. Supplemental information may include the date and time of exchange, the location of the exchange, and/or information identifying the EV 102 and/or the operator/customer. Here, each of the plurality of battery exchange facilities are associated with an identifier that identifies a location of that particular battery exchange facility 206.

Other supplemental information may include remaining power in the discharged battery module 202 and/or the power level of the recharged battery module 202 that was received by the operator/customer. The battery information tracking module 318 may run various diagnostic routines to assess the operational condition of the discharged battery module 202 that has been received, and/or to assess the operational condition of the charged battery module 202 that is going to be received, by the operator/customer. The operational condition is defined as a condition of the various components of a battery module 202 being at least equal to a condition threshold that corresponds to a satisfactory operating condition of that component. In the various embodiments, if the battery resource manager 208 assesses the condition of a battery module 202 and determines that the condition of one of more of the components does not meet the corresponding operational condition threshold, that battery module 202 will not be released to a user. Rather, the inoperative battery module 202 will be retained by the battery exchange facility 206, which will then report the inoperative battery module 202 to a central dispatch facility 340, and then release the inoperative battery module 202 to service personnel who will be dispatched to the battery exchange facility 206 to retrieve the inoperable battery module 202. Optionally, the battery resource manager 208 may communicate other test result information for operable and inoperable battery modules 202 to the central dispatch facility 340 and to other interested parties.

Another optional function of the battery resource manager 208 is to facilitate communication with other battery resource managers 208. Examples include, but are not limited to, inventory control may be facilitated between battery resource managers 208 and/or a central dispatch facility 340. Here, the battery resource manager 208 at the battery exchange facility 206 that issued the discharged battery module 202 to the operator/customer (which was recharged) can be notified of the exchange at another battery exchange facility 206 and/or the central dispatch facility 340.

If a damaged battery module 202 is identified, the battery resource manager 208 may facilitate replacement of the damaged battery module 202 with a replacement battery module 202 by communicating the information to the central dispatch facility 340. The central dispatch facility 340 may automatically arrange for a service person to replace the damaged battery module 202 with a functioning battery module 202.

The battery recharge module 316 manages the charging of a received discharged battery module 202. Voltage, current and power received at a charging battery module 202 can be monitored and controlled to determine cost of the recharge and to limit or control the amount of power provided to the recharging battery module 202. Generally, the cost of recharging is the cost of power paid to the power provider, plus other incidental costs.

One skilled in the art appreciates that when there are numerous battery exchange facilities 206 are distributed over a large region, that the battery exchange facilities 206 may receive power provided by different power providers (power companies, utilities, or the like). Thus, the cost of recharging may be different depending upon the rates charged for the power consumed during the recharge. This actual cost information may be used to determine the fee charged to the user. That is, the cost of obtaining a recharged battery module 202 may vary between battery exchange facilities 206. Further, actual cost information may be communicated to the central dispatch facility 340. In some embodiments, the user may obtain cost information from different battery resource managers 208 so that they can identify a preferred battery exchange facility 206 that has a best cost and/or a most convenient location.

Once a battery module 202 has been recharged, the battery recharge module 316 may disconnect the charged battery module 202 from the power supply bus 210 that is connected to the local electric power grid to end the charging process. Further, the disconnecting of the battery module 202 may be appropriate for safety reasons. In some embodiments, a disconnect device 212, such as a breaker or the like, may be used to disconnect the battery module 202 from the local electric power grid. The disconnect device 212 may provide a visible indicator that can be seen by a person so that they understand that it is safe to handle the battery module 202. A securing device may be included with the disconnect device 212 to prevent removal of the battery module 202 while the battery module 202 is connected to the power supply bus 210.

Periodically, the battery recharge module 316 may monitor charge on the battery modules 202 stored at the battery exchange facility 206, wherein the battery recharge module 316 may add additional electrical charge to the battery modules 202 to ensure that the battery modules 202 remain in a recharged state with the predefined amount of electrical power that defines a battery module 202 as being recharged.

In some embodiments, the plurality of battery resource managers 208 may operate as a peer to peer network to facilitate communication with one or more central dispatch facilities 340 and/or with other battery resource managers 208.

In some embodiments, industry standards are defined for a plurality of different sized battery modules 202 with different electric power capacities and the EV's corresponding battery swap cabinet 204. Different standards are used by all electric vehicle manufacturers that are participating. For instance, battery module 202A may be used for sedans, battery module 202B may be used for SUVs, and battery module 202C may be used for trucks since these different types of EVs 102 may have different power requirements. The battery swap cabinet 204 will have different sizes accordingly with similar structures which will contribute to an easier process of replacing a particular sized discharged battery module 202.

An unexpected advantage provided by embodiments of the EV battery resource sharing system 200 results from the scalability of the system. Initially, a battery exchange facility 206 may be co-located with and/or be in close proximity to an existing gasoline retail outlet (gas station). Since the size of a battery exchange facility 206 may be relatively small (compared to the size required for a legacy gas station), the battery exchange facility 206 may be located on or adjacent to the gas station property. As more and more client users, such as owners of the EVs 102, begin to use more and more battery modules 202, the modular nature of an EV battery resource sharing system 200 permit additional battery exchange facilities 206 to be installed at a single location as demand for recharged battery modules 202 increases. Further, other locations may be used for battery exchange facilities 206, such as parking lots or garages at shopping malls, restaurants, travel rest stops, etc.

Also, employees currently working at legacy gas station may be cross trained to swap out battery modules 202. As the use of gas decreases and transition to use of the EV battery resource sharing system 200 occurs, these cross trained employees may be able to retain their jobs as the growing EV industry displaces legacy gas powered vehicles. Further, the business owners of the legacy gas station may retain their business as they will be able to provide both gas to legacy vehicles and battery modules 202 to EVs 102. Eventually, a legacy gas station may transition to providing only battery modules 202 to EV owners.

Figure 4:
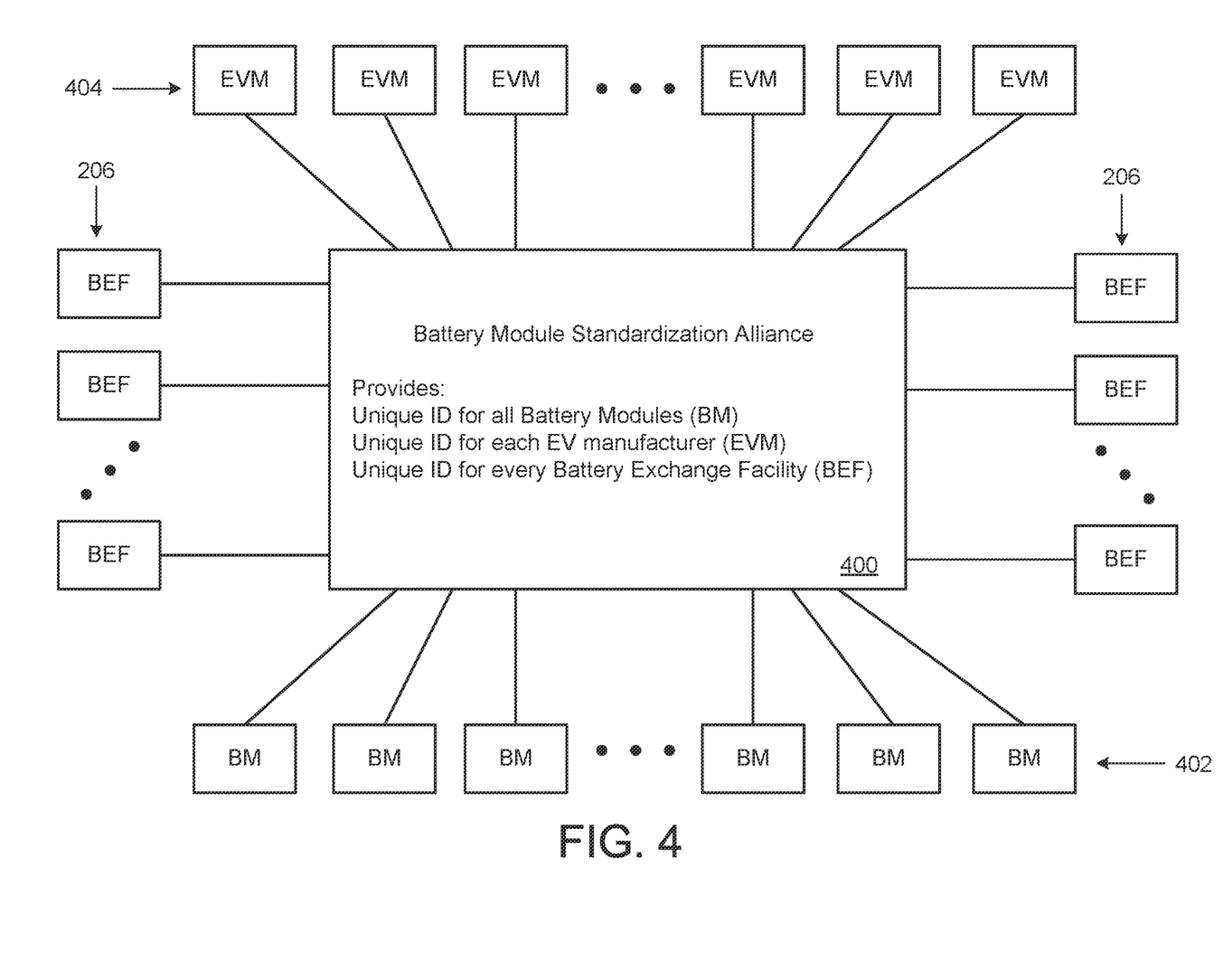
FIG. 4 conceptually illustrates a battery module standardization alliance.

FIG. 4 conceptually illustrates a battery module standardization alliance 400. The alliance 400 is formed by agreement between battery manufacturers/providers 402. EV manufacturers 404, and the battery exchange facilities 206 to use a standardized battery module 202. Each battery manufacturer/provider 402, EV manufacturer 404, and battery exchange facility 206 is identified by a unique identifier.

It should be emphasized that the above-described embodiments of the EV battery resource sharing system 200 are merely possible examples of implementations of the invention. Many variations and modifications may be made to the above-described embodiments. All such modifications and variations are intended to be included herein within the scope of this disclosure and protected by any later filed claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" or "an" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

Therefore, having thus described the invention, at least the following is claimed:

1. An electric vehicle (EV) battery resource sharing method that provides a plurality of standardized EV battery modules to users of Electric Vehicles (EV), wherein each EV battery module is configured to provide power to a plurality of different models of EVs manufactured by a plurality of different vehicle manufacturing companies, wherein each one of the plurality of standardized EV battery modules has an EV module information device that stores battery module information associated with the standardized EV battery module, and wherein the plurality of standardized EV battery modules includes a first standardized EV battery module and a second standardized EV battery module, the method comprising:

receiving from a user of an EV, at a battery exchange facility, a return of the first standardized EV battery module that is at least partially discharged;

releasing, at the battery exchange facility, the second standardized EV battery module that is fully charged only after completion of a user payment by the user for the fully charged second standardized EV battery module;

communicatively coupling a battery resource manager to the module information device of the first standardized EV battery module;

monitoring, by the battery resource manager, an amount of power for a recharging of the first standardized EV battery module to a fully charged state;

determining, by the battery resource manager, a cost of power to be paid to a power provider based on the monitored amount of power for the recharging of the first standardized EV battery module;

identifying, by the battery resource manager, an owner of the second standardized EV battery module based on a first unique identifier included in the battery module information of the second standardized EV battery module;

determining, by the battery resource manager, a first payment due to the power provider based on the determined cost of power for recharging of the first standardized EV battery module;

determining, by the battery resource manager, a second payment due to an owner of the second standardized EV battery module based on the EV battery module information of the second standardized EV battery module; and determining, by the battery resource manager, a third payment due to an owner of the battery exchange facility.

2. The EV battery resource sharing method of claim 1, further comprising:
receiving, at the battery exchange facility, the user payment from the user for the fully charged second standardized EV battery module; and
in response to receiving the user payment from the user for the fully charged second standardized EV battery module, the method further comprises:
paying the first payment due to the power provider;
paying the second payment due to the owner of the second standardized EV battery module; and
paying the third payment due to the owner of the battery exchange facility.

3. The EV battery resource sharing method of claim 2, wherein the first payment that is due to the power provider, the second payment due to the owner of the second standardized EV battery module, and the third payment due to the owner of the battery exchange facility equals the user payment by the user for the charged second standardized EV battery module.

4. The EV battery resource sharing method of claim 1, wherein the battery exchange facility is a first battery exchange facility, and wherein prior to the return of the first standardized EV battery module at the first battery exchange facility, the method further comprising:
releasing, at a second battery exchange facility that is at a location that is different from the first battery exchange facility, the first standardized EV battery module that is fully charged in response to completion of a prior user payment by the user for the fully charged first standardized EV battery module;
determining, by the battery resource manager, a fourth payment due to an owner of the first standardized EV battery module;
determining, by the battery resource manager, a fifth payment due to an owner of the second battery exchange facility;
paying the fourth payment due to the owner of the first standardized EV battery module in response to receiving the user payment from the user for the fully charged first standardized EV battery module; and
paying the fifth payment due to the owner of the second battery exchange facility in response to receiving the user payment from the user for the fully charged first standardized EV battery module.

5. The EV battery resource sharing method of claim 1, wherein a power bus at the battery exchange facility is coupled to a power source that includes at least one of a local electric power grid, a solar panel, and a wind generator, wherein the power source provides electrical power to the power supply bus, the method further comprising:
electrically coupling the first standardized EV battery module to the power bus via a disconnect device located at the battery exchange facility;
recharging, at the battery exchange facility, the first standardized EV battery module;
monitoring, by the battery resource manager, when a total amount of electrical power stored by the first standardized EV battery module during the recharging equals a predefined amount of power; and
actuating, by the battery resource manager, the disconnect device to decouple the first standardized EV battery module from the power bus after the first standardized EV battery module has recharged to the predefined amount of electrical power.

6. The EV battery resource sharing system of claim 5, wherein recharging the first standardized EV battery module comprises:
recharging the first standardized EV battery module during an off peak time of day.

7. The EV battery resource sharing method of claim 1, further comprising:
acquiring, by battery resource manager, the battery module information pertaining to the first standardized EV battery module that has been stored on the module information device of the first standardized EV battery module, wherein the acquired battery module information comprises:
battery module identity information that uniquely identifies the first standardized EV battery module, and
use history information pertaining to use history of the first standardized EV battery module;
updating the use history information, wherein the updated use history information corresponds to the amount of the electrical power provided to the first standardized EV battery module during the recharging process; and
storing the updated use history information into the battery module information of the first standardized EV battery module.

8. The EV battery resource sharing method of claim 7, wherein the battery resource manager is remote from the battery exchange facility, the method further comprising:
communicatively coupling the battery resource manager to the battery exchange facility via a network;
communicating from the battery resource manager to a battery information database the battery module identity information that uniquely identifies the first standardized EV battery module, the updated use history information pertaining to the first standardized EV battery module, and user identity information that identifies the user; and
storing the updated use history information pertaining to the first standardized EV battery module and user identity information that identifies the user into the battery information database based on the battery module identity information that uniquely identifies the first standardized EV battery module,
wherein each of the plurality of standardized EV battery modules are uniquely identified in the battery information database.

9. The EV battery resource sharing method of claim 1, further comprising:
communicatively coupling the battery resource manager to a central dispatch center via a network;
assessing, by the battery resource manager, an operational condition of the first standardized EV battery module after the first standardized EV battery module has been returned to the battery exchange facility;
communicating from the battery resource manager to the central dispatch center first identity information that uniquely identifies the first standardized EV battery module, second identity information that uniquely identifies a first battery manufacturer that manufactured the first standardized EV battery module, use history information for the first standardized EV battery module, and information corresponding to the operational condition of the first standardized EV battery module;
arranging, by the central dispatch facility, a replacement standardized EV battery module to be sent to the battery exchange facility when the operational condition of the first standardized EV battery module is unsatisfactory; and arranging, by the central dispatch facility, a removal of the first replacement standardized EV battery module from the battery exchange facility when the operational condition of the first standardized EV battery module is unsatisfactory.

10. The EV battery resource sharing method of claim 1, wherein prior to the return of the first standardized EV battery module at the first battery exchange facility, the method further comprising:

securing, using a securing device controllably coupled to the battery resource manager, the fully charged second standardized EV battery module within the battery exchange facility;

monitoring, by the battery resource manager, the user payment by the user for the fully charged second standardized EV battery module; and actuating the securing device to release the fully charged second standardized EV battery module to the user in response to completion of the user payment by the user for the fully charged second standardized EV battery module.

11. The EV battery resource sharing method of claim 10, further comprising:

monitoring, by the battery resource manager, the return of the first standardized EV battery module to the battery exchange facility by the user; and actuating the securing device to release the fully charged second standardized EV battery module to the user in response to the return of the first standardized EV battery module to the battery exchange facility by the user.

12. The EV battery resource sharing method of claim 11, wherein the securing device is a first securing device that has secured the second standardized EV battery module, the method further comprising:

actuating a second securing device to secure the first standardized EV battery module that has been returned by the user, wherein the battery resource manager actuates the first securing device to release the fully charged second standardized EV battery module to the user in response to the user completing the user payment for the fully charged second standardized EV battery module and in response to the battery resource manager actuating the second securing device to secure the first standardized EV battery module that has been returned by the user.

13. The EV battery resource sharing method of claim 11, wherein the user payment is a first user payment, the method further comprising:

receiving a second user payment from the user instead of the first user payment in response to the user failing to return the first standardized EV battery module, wherein the second user payment is larger than the first user payment; and actuating the securing device to release the fully charged second standardized EV battery module to the user in response to the user completing the second payment that is larger than the first payment.

14. The EV battery resource sharing method of claim 1, wherein prior to the releasing of the second standardized EV battery module at the first battery exchange facility, the method further comprising:

communicatively coupling the battery resource manager to a mobile electronic device of the user via a network connection; and communicating, from the battery resource manager to the mobile electronic device of the user, invoice information pertaining to the user payment charged to the user to obtain the fully charged second standardized EV battery module.

15. The EV battery resource sharing method of claim 1, further comprising:

communicatively coupling the battery resource manager residing in each of the plurality of battery exchange facilities to a central dispatch facility, wherein each of the plurality of battery exchange facilities is uniquely identified by a location identifier that identifies a location of that particular battery exchange facility, wherein each of the plurality of battery exchange facilities is uniquely identified by a battery exchange facility identifier that identifies each particular battery exchange facility, and wherein each of the plurality of standardized EV battery module are uniquely identified by battery module identity information;

communicating information from each of the battery resource managers to the central dispatch facility, wherein the communicated information the battery module identity information for each of the plurality of standardized EV battery modules located at the battery exchange facility and the associated battery exchange facility identifier; and determining, at the central dispatch facility, a current location of each one of the plurality of standardized EV battery modules.

16. The EV battery resource sharing method of claim 15, further comprising:

communicating current use information from the battery exchange facility to the central dispatch facility pertaining to the fully charged second standardized EV battery module that is received by the user, wherein the current use information includes at least the battery module identity information of the fully charged second standardized EV battery module that is received by the user, identity information of the user, and a time that the fully charged second standardized EV battery module that was received by the user.

17. The EV battery resource sharing method of claim 1, wherein the plurality of standardized EV battery modules is a first plurality of standardized EV battery modules that are configured to provide electric power to a first type of vehicle, wherein a second plurality of standardized EV battery modules are configured to provide electric power to a second type of vehicle, and wherein at least one of a size and an electric power capacity of the second plurality of standardized EV battery modules is different from the size and the electric power capacity of the first plurality of standardized EV battery modules.

18. The EV battery resource sharing method of claim 1, further comprising:

determining, by the battery exchange facility, an amount of remaining power residing in the first standardized EV battery module; and determining, by the battery exchange facility, a value of the amount of the remaining power residing in the first standardized EV battery module, wherein the value of the amount of the remaining power in the first standardized EV battery module is credited to the user.

19. The EV battery resource sharing method of claim 1, further comprising:

determining, by the battery exchange facility, an amount of remaining power residing in the first standardized EV battery module; and determining, by the battery exchange facility, a value of the amount of the remaining power residing in the first standardized EV battery module, wherein the value of the amount of the remaining power in the first standardized EV battery module reduces the amount of the user payment by the user for the second standardized EV battery module.

* * * * *